United States Patent [19]

Berger

[11] Patent Number: 4,707,231

[45] Date of Patent: Nov. 17, 1987

[54] PROCESS FOR PREPARING COMPOSITE MATERIALS AND PRODUCTS OBTAINED WITH SAID PROCESS

[75] Inventor: Michel Berger, Sainte Helene, France

[73] Assignee: Pradom Limited, London, England

[21] Appl. No.: 777,622

[22] Filed: Sep. 19, 1985

[30] Foreign Application Priority Data

Sep. 26, 1984 [FR] France .................. 84 14800

[51] Int. Cl.⁴ ........................................... C07G 13/00
[52] U.S. Cl. ................... 204/164; 156/272.2; 204/165; 204/168; 252/502; 264/24; 264/26; 427/26; 428/365; 428/366; 428/368
[58] Field of Search ............ 204/164, 165, 168; 252/502; 427/26; 264/24, 26; 156/272.2; 428/366, 368, 365, 934

[56] References Cited

U.S. PATENT DOCUMENTS

| | | | |
|---|---|---|---|
| 3,073,732 | 1/1963 | Hunsdiecker | 154/43 |
| 3,626,041 | 12/1971 | Fields et al. | 204/164 |
| 3,745,104 | 7/1973 | Hou | 204/164 |
| 3,767,505 | 10/1973 | Coran et al. | 156/276 |

FOREIGN PATENT DOCUMENTS

| | | | |
|---|---|---|---|
| 50-29939 | 9/1975 | Japan | 264/24 |
| 816285 | 7/1959 | United Kingdom | 264/24 |

Primary Examiner—Arthur P. Demers
Attorney, Agent, or Firm—Weingarten, Schurgin, Gagnebin & Hayes

[57] ABSTRACT

The present invention relates to a process for the preparation of a composite material wherein the element used to reinforce the composite material is subjected to an electrostatic field induced by a high voltage electric current, said element being then impregnated with a liquid matrix material or precursor of matrix, while still under the influence of said field, and to the composite materials obtained by carrying out said process.

6 Claims, 9 Drawing Figures

PROCESS FOR PREPARING COMPOSITE MATERIALS AND PRODUCTS OBTAINED WITH SAID PROCESS

FIELD OF THE INVENTION

The present invention relates to a process for preparing composite materials; it also relates to the intermediate or finished products which can be obtained with said process.

BACKGROUND OF THE INVENTION

Composite materials are materials constituted of reinforcing elements (mostly fibers - or filaments - such as glass fibers, carbon fibers, boron or polyamide fibers, etc. ...) and of a matrix (constituted either by a resin or a resistant material such as metal or ceramics).

The properties of composite materials are particularly dependent, as we know, on:
the orientation of the reinforcing elements;
the good distribution of the matrix through the volume between the reinforcing elements;
and of any bonds which may be induced between said reinforcing elements and said matrix.

SUMMARY OF THE INVENTION

It is therefore an advantage to use a technique wherein the above parameters can be worked in such a way as to optimize the properties of the product as a function of the aim in view, and this is precisely the object of the present invention.

To this effect, it has been found that the reinforcing elements could be advantageously subjected to an electrostatic field induced by a very high voltage current, and then impregnated with the liquid matrix, using the known techniques, while said elements are still under the influence of said field.

By high voltage current-induced electrostatic field is meant a field at least equal to the field obtained by applying between two electrodes 20 mm apart, a voltage equal to at least 20,000 volts in alternating current and to at least 40,000 volts in direct current. The reinforcing elements, and in particular the fibers, fibrils or roves used, are then positioned between the electrodes subjected to the very high voltage current.

According to the invention, any type of fibers can be used as reinforcing elements, but they must be of a dielectric material, namely a material which, when under the effect of the field, becomes electrically charged and remains charged for a certain time. This is the case for example with polyamide fibers (of NYLON or KEVLAR type), glassfibers, fibers in certain metallic oxides, fibers in complex materials (metaloxide) and with carbon fibers. On the contrary, conducting fibers, such as for example metallic fibers or surface-metallized fibers are more difficult to use in the process according to the invention.

The reinforcing fibers are placed between the electrodes, and the very high voltage current is applied between said electrodes for a period long enough to charge said fibers, then, the charged fibers, taken out of the field, are impregnated with the matrix material or with a precursor of the matrix material, which is in liquid form.

The charged fibers having a tendency to push one another back, a bed of fibers is obtained at the output of the field, of which the thickness is between two and four times the thickness of the bed of fibers initially introduced between the electrodes, and its is when the fibers are in that "swollen" state that they should be impregnated.

Any one of the currently known and used matrix materials is suitable for the process according to the invention, for example resins (epoxy or polyamide resins or hardened carbon mixtures) or silica-based mixtures capable of forming ceramics, and metals.

When the fibers have been impregnated by the liquid matrix material (or its liquid precursor), the resulting product can either be sold as is (normally after a first solification) or it can be transformed by molding and solidification of the matrix. And as known, the matrix itself can be charged.

It has been found that with the process according to the invention, the reinforcing elements (fibers) become thoroughly impregnated by the matrix.

But it is also possible to bring to the process according to the invention certain particularly advantageous alterations.

If the electrostatic field is produced with a direct current, it is noted that, besides the swelling action of the bundle of initial fibers, there occurs a complementary orientation of said fibers. This orientation will permit the preparation of a composite material having specific properties.

It is also possible, as we know, to obtain that same orientation for certain fibers, by the simultaneous or prior use of another field such as for example a magnetic field.

If the electrostatic field is produced with an alternating current, it is noted that besides the swelling action of the bundle of fibers described hereinabove, localized discharges occur between the fibrils, causing, principally in the presence of oxygen, a modification of the surface of the fibers. This modification (which is probably an oxidation), stimulates the properties of the final material insofar as it makes it possible to obtain consolidated bonding between the fiber and the matrix.

It is conceivably possible, according to the invention, to use successively an A.C. electrostatic field (swelling and surface treatment) and a D.C. electrostatic field (swelling and orientation).

BRIEF DESCRIPTION OF THE DRAWINGS

The invention will be more readily understood on reading the following description of a non-restrictive example, with reference to the accompanying FIGS. 1-9.

DETAILED DESCRIPTION OF THE EXEMPLARY EMBODIMENTS

Figure 1:
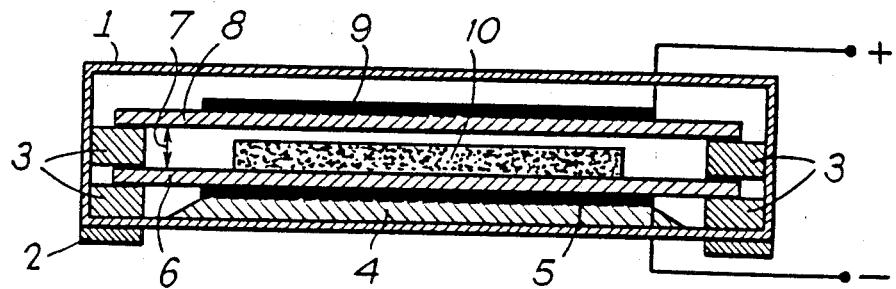
FIG. 1 is a sectional view illustrating an exemplary apparatus useful in explaining the method of the instant invention.
Figure 2:
FIG. 2 is a fragmentary, schematic diagram illustrating a fiber bundle before treatment in the FIG. 1 apparatus in accordance with the method of the invention.
Figure 3:
FIG. 3 is a fragmentary, schematic diagram illustrating the same fiber bundle of FIG. 2 after treatment in the FIG. 1 apparatus in accordance with one aspect of the method of the instant invention.

Referring first to FIG. 1, this shows a casing of insulating material 1 resting on insulating support members 2, and containing, in position between wedge members 3 and resting on an insulating base 4: a first plate-shaped lower electrode 5, a first dielectric 6, a gap 7, a second dielectric 8 and a second, equally plate-shaped electrode 9. The fibrous bundle 10 is placed between the two dielectrics. The two electrodes 5 and 9 are connected to a generator of direct current of voltage about 100,000 volts. The assembly is charged for about 10 mins. for fibrils of between 5 and 6 mm thickness. FIG. 2 shows the bundle before being charged, and FIG. 3 shows the bundle after a 10-minute charging treatment.

It is found after successive experiments that the volume has virtually doubled, hence, doubling the volume between the fibrils, the actual volume of the fibrils remaining unchanged.

Figure 4:
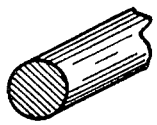
FIG. 4 is a fragmentary view of a single fibril of the fiber bundle of FIG. 2.
Figure 5:
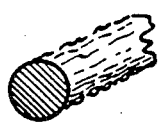
FIG. 5 is a schematic, fragmentary diagram illustrating a fibril of the fiber bundle of FIG. 3.

FIG. 4 shows a microscopic view of a fibril before the treatment, and FIG. 5 shows the same fibril as ground after the treatment.

Figure 6:
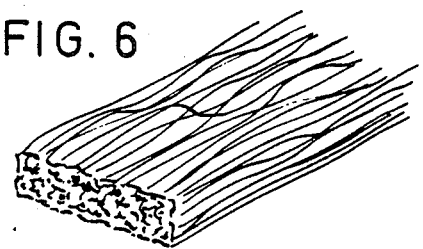
FIG. 6 is a fragmentary schematic view illustrating a disordered fiber bundle before treatment in the FIG. 1 apparatus in accordance with another aspect of the inventive method.
Figure 7:
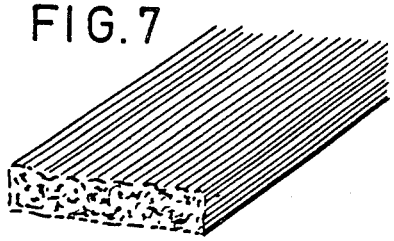
FIG. 7 in an ordered fiber bundle that results after treatment in the FIG. 1 apparatus in accordance with that aspect of the inventive method.

From a practical standpoint, it has been found that the fact of subjecting the whole bundle of fibrils to a first A.C. field in order to obtain a more efficient etching with alternating current, and then subjecting it to a D.C. field in order to create an expansion, greatly contributes to obtaining a ground, expanded and tidy bundle. Indeed, a third effect noted is that a rather disorderly bundle, such as illustrated in FIG. 6, becomes perfectly orderly after a treatment in a high voltage D.C. electrostatic field, as illustrated in FIG. 7.

Figure 8:
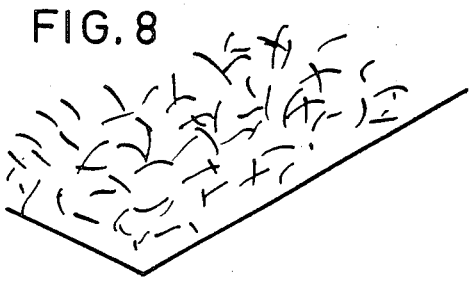
FIG. 8 is a partial, schematic diagram illustrating short, randomly oriented, inhomogeneous fibers prior to treatment in the FIG. 1 apparatus in accordance with a further aspect of the instant invention.
Figure 9:
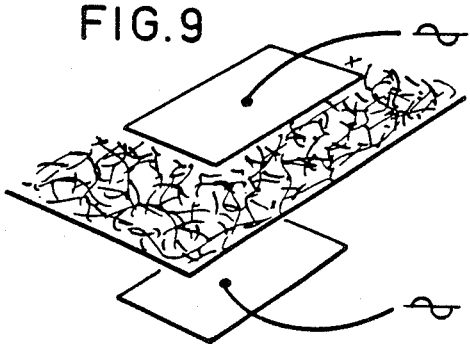
FIG. 9 is a schematic, partial diagram illustrating the same short, randomly oriented fibers that are more homogeneous after treatment in the FIG. 1 apparatus in accordance with the inventive method.

Another application, this time using A.C. voltage, consists in injecting short fibers between the two electrodes, as illustrated in FIG. 8 and subjecting them to a high voltage A.C. field, as illustrated in FIG. 9. It is found then that a bundle of short fibers is obtained in which the fibers are arranged somewhat randomly but homogeneously, which is very advantageous in the case of short fiber composites, since sequencing always gives breaking points, hence weak points.

What I claim is:

1. Process for the preparation of a composite material that includes fibers used to reinforce the composite material comprising the steps of:
    subjecting the fibers to an electrostatic field induced by a high-voltage alternating electric current for a time interval sufficient to cause a modification of the surface of said fibers; and
    impregnating said fibers after the elapse of said time interval with a liquid matrix material or precursor of matrix, while still under the influence of said field, thereby consolidating bonding between the fibers and the matrix.

2. A process for the preparation of a composite material that includes fibers used to reinforce the composite material comprising the steps of:
    subjecting the fibers to a first electrostatic field that is induced by a first high-voltage electric current for a first non-zero time interval;
    subjecting the fibers to a second electrostatic field different from said first electrostatic field that is induced by a second high-voltage electric current for a second non-zero time interval after subjecting the fibers to said first electrostatic field; and
    impregnating said fibers with a liquid matrix or precursor of matrix, after the elapse of said two time intervals, while still under the influence of said second field thereby consolidating bonding between the fibers and the matrix.

3. The process as claimed in claim 2, wherein one of said first and second fields is induced by a D.C. electric current and the other of said first and second fields is induced by an A.C. electric current.

4. The process as claimed in claim 3, wherein said D.C. electric current is at a voltage equal to at least 40,000 volts and said A.C. electric current is at a voltage equal to at least 20,000 volts.

5. The process is claimed in claim 3, wherein said fibers are a dielectric material selected from the group consisting of polyamine fibers, glass fibers, metallic oxide fibers, carbon fibers, and combinations thereof.

6. Composite materials obtained by carrying out the process of claim 1.

* * * * *

UNITED STATES PATENT AND TRADEMARK OFFICE
CERTIFICATE OF CORRECTION

PATENT NO. : 4,707,231

DATED : November 17, 1987

INVENTOR(S) : Michel Berger

It is certified that error appears in the above-identified patent and that said Letters Patent is hereby corrected as shown below:

Column 1, line 21, "through" should read --throughout--
line 26, "INVENTION" should read --INVENTION--

Column 2, line 1, "its is" should read --it is--
line 12, "solification)" should read --solidification)--

Column 3, line 1, "FIG. 7 in an" should read --FIG. 7 is an--

Column 4, line 43, "process is" should read --process as--
line 45, "polyamine" should read --polyamide--

Signed and Sealed this

Fourteenth Day of March, 1989

Attest:

DONALD J. QUIGG

*Attesting Officer*  *Commissioner of Patents and Trademarks*